Figure 6:
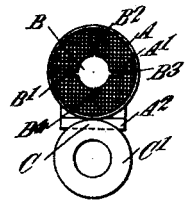

T. F. GAYNOR & F. GRIFFIN.
SIGHTING AND RANGE FINDING DEVICE FOR FIREARMS.
APPLICATION FILED FEB. 23, 1916.
1,222,620.
Patented Apr. 17, 1917.
5 SHEETS—SHEET 1.
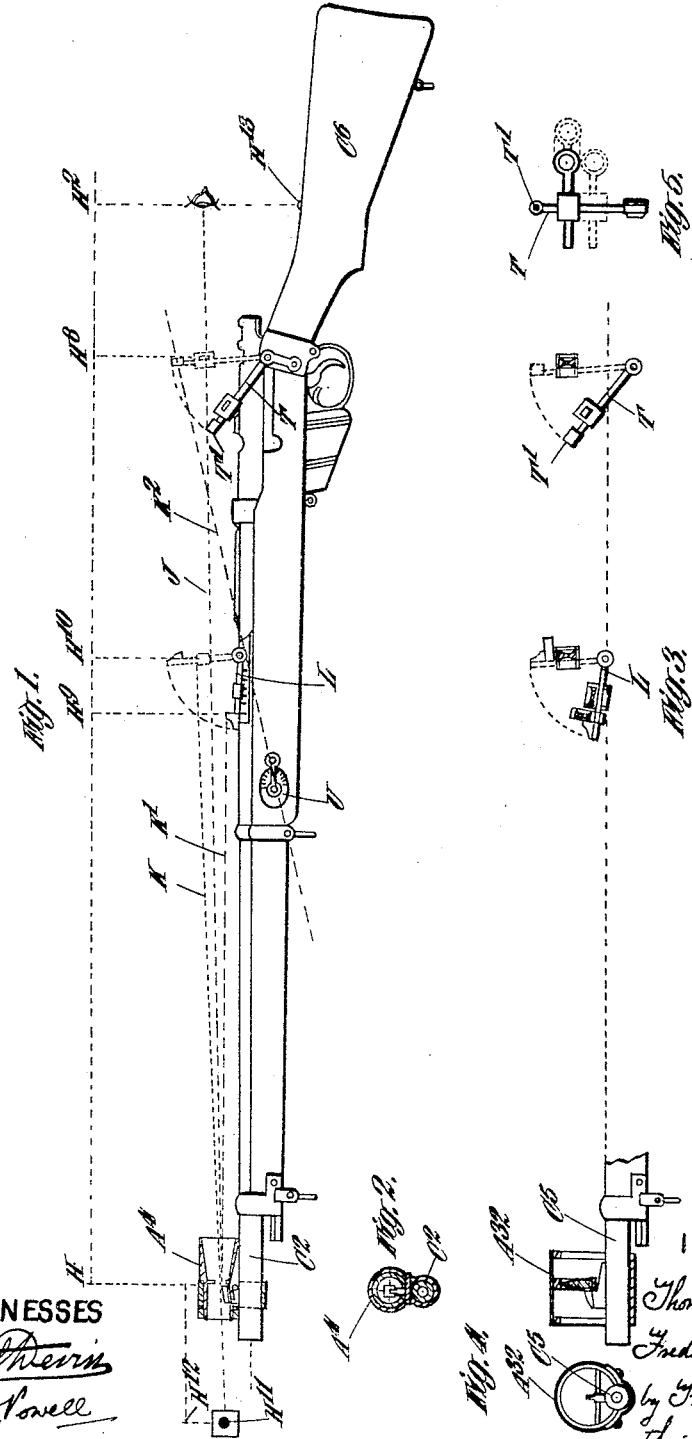
INVENTORS.
Thomas Francis Gaynor,
Frederick Griffin,
by Thomas F. Gaynor
their Attorney.
WITNESSES T. F. GAYNOR & F. GRIFFIN.
SIGHTING AND RANGE FINDING DEVICE FOR FIREARMS.
APPLICATION FILED FEB. 23, 1916.

1,222,620.

Patented Apr. 17, 1917.
5 SHEETS—SHEET 2.

WITNESSES
Paul Devin
H. D. Powell.

INVENTORS
Thomas Francis Gaynor.
Frederick Griffin.
by Thomas F. Gaynor, their Attorney.

T. F. GAYNOR & F. GRIFFIN.
SIGHTING AND RANGE FINDING DEVICE FOR FIREARMS.
APPLICATION FILED FEB. 23, 1916.
1,222,620.
Patented Apr. 17, 1917.
5 SHEETS—SHEET 3.
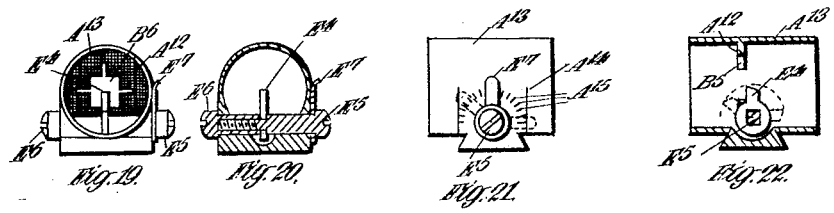
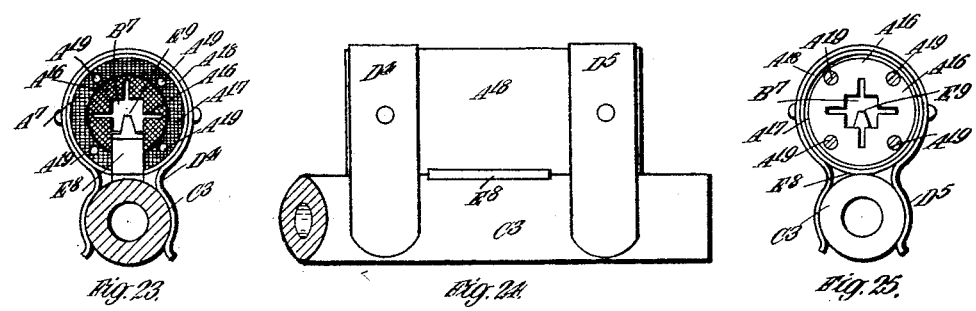
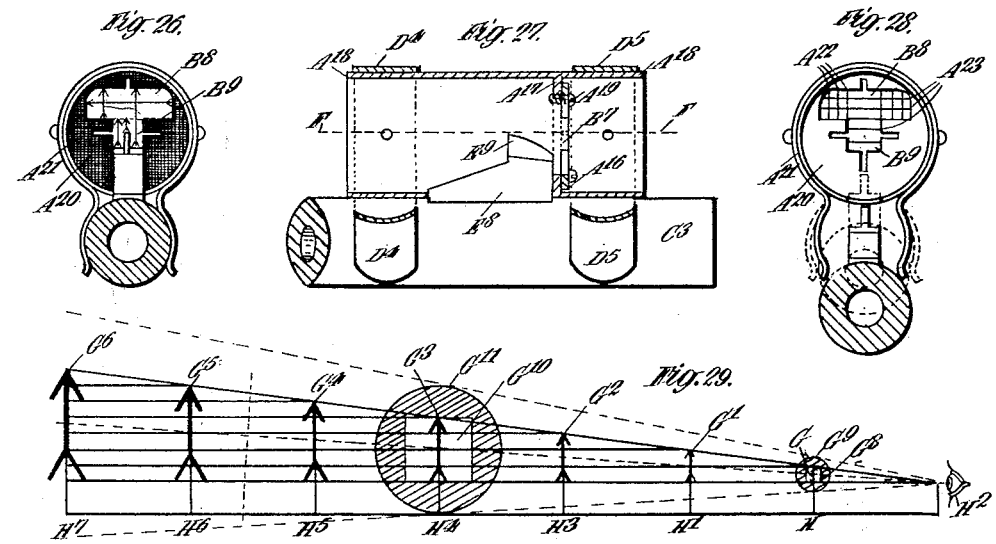
WITNESSES.
INVENTORS.
Thomas Francis Gaynor
Frederick Griffin.
by Thomas F. Gaynor, their Attorney.

T. F. GAYNOR & F. GRIFFIN.
SIGHTING AND RANGE FINDING DEVICE FOR FIREARMS.
APPLICATION FILED FEB. 23, 1916.
1,222,620.
Patented Apr. 17, 1917.
5 SHEETS—SHEET 4.
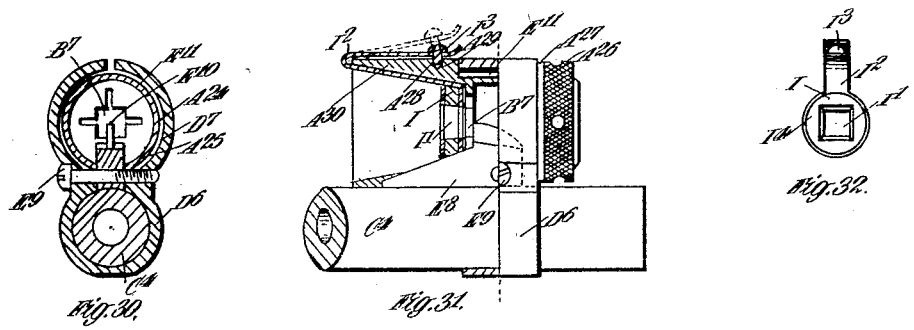
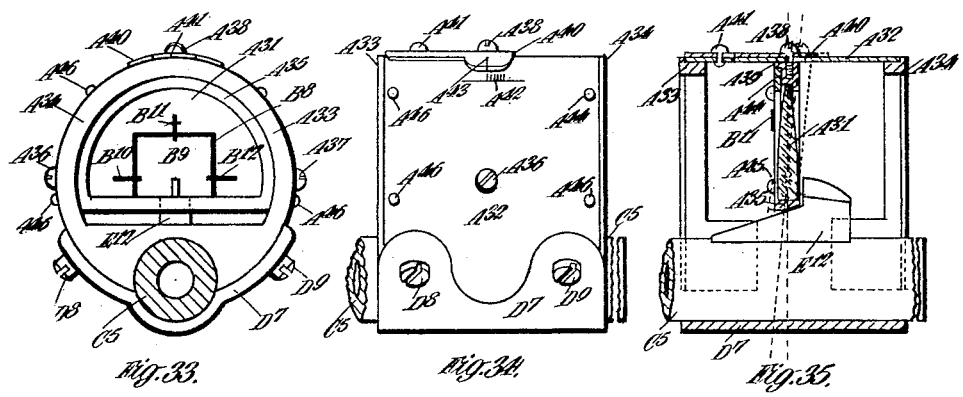
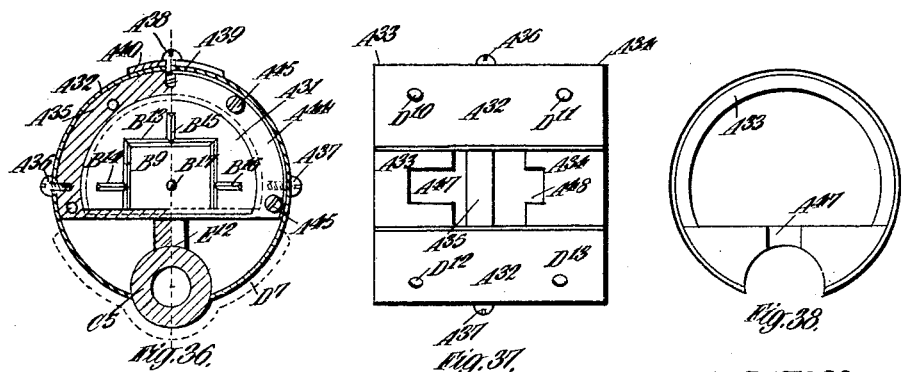
WITNESSES
INVENTORS
Thomas Francis Gaynor,
Frederick Griffin.
by Thomas F. Gaynor,
their Attorney.

T. F. GAYNOR & F. GRIFFIN.
SIGHTING AND RANGE FINDING DEVICE FOR FIREARMS.
APPLICATION FILED FEB. 23, 1916.
1,222,620.
Patented Apr. 17, 1917.
5 SHEETS—SHEET 5.
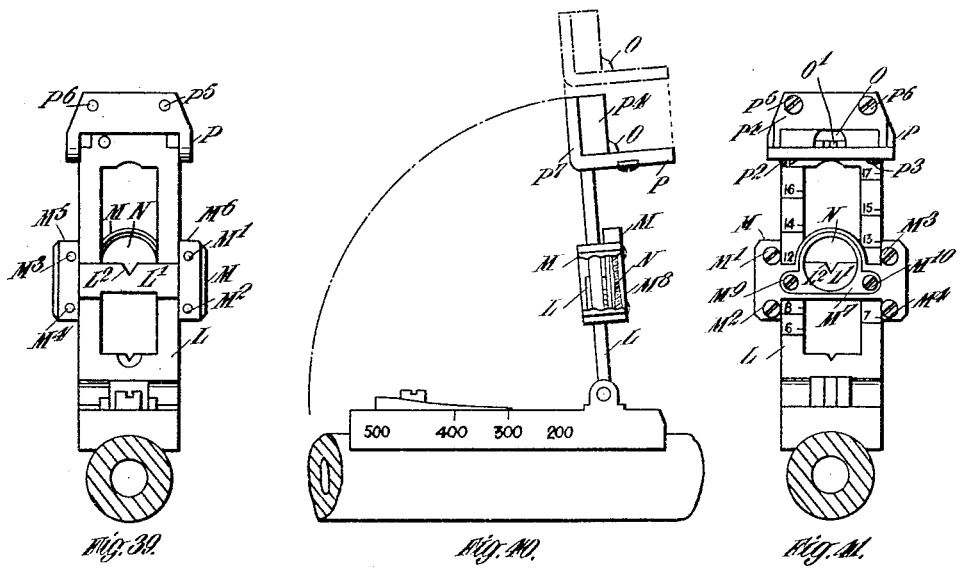
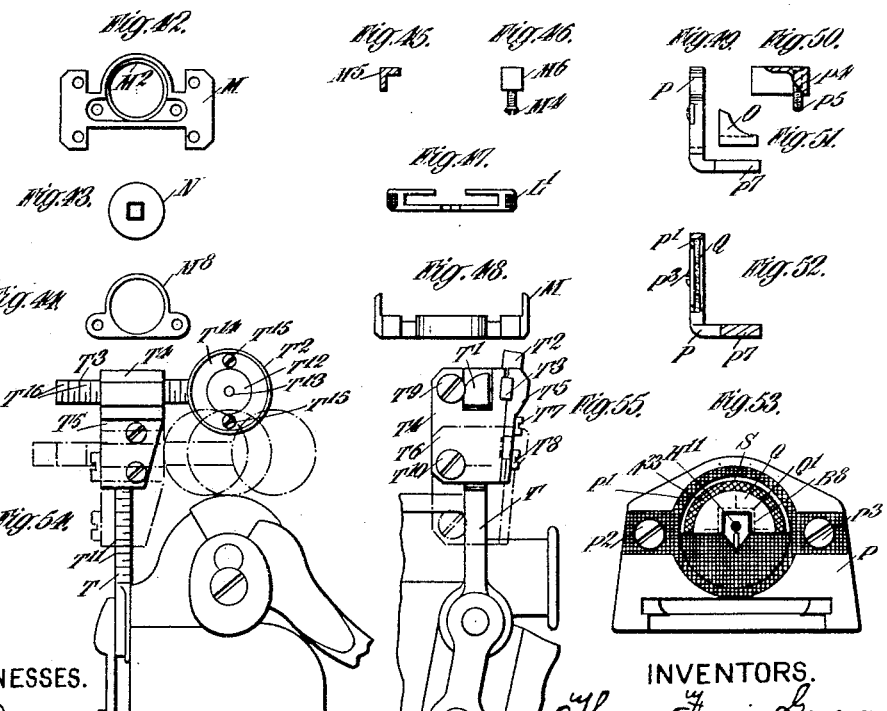

UNITED STATES PATENT OFFICE.

THOMAS FRANCIS GAYNOR, OF BROOKLYN, NEW YORK, AND FREDERICK GRIFFIN, OF LONDON, ENGLAND.

SIGHTING AND RANGE-FINDING DEVICE FOR FIREARMS.

1,222,620.   Specification of Letters Patent.   Patented Apr. 17, 1917.

Application filed February 23, 1916. Serial No. 79,963.

*To all whom it may concern:*

Be it known that we, THOMAS FRANCIS GAYNOR, a citizen of the United States of America, and resident of Brooklyn, New York city, county of Kings, and State of New York, and temporarily residing in the city of London, England, and FREDERICK GRIFFIN, a British subject, and resident of the city of London, county of London, England, have invented a new and useful Improvement in Sighting and Range-Finding Devices for Firearms, of which the following is a specification.

This invention relates to sighting and range finding devices for guns, and in combination with a firearm it consists substantially of a diaphragm having a central opening or window of definite and symmetrical outline provided with radial indicators, the window being surrounded by a dark colored, or shadowed border, produced either by a suitable dark colored substance applied to the surfaces of the diaphragm, or by means of a short tube within which, the diaphragm is fixed, and which thus causes the latter to be in the shadow of the interior of the tube, when the device is being viewed through the tube, and used.

When magnification of the objective and its surrounding fields is required, the diaphragm is made in the form of a telescopic object glass lens with the window outline and its radial indicators suitably marked thereon or affixed thereto and being of enlarged dimensions as compared with these features of the non-magnifying form of the device, in direct proportion to the degree of magnification utilized, and this being an important form of the invention, whether used with or without other lenses as eyepieces, or with other sighting elements such as peep sights or the like, which are usually used as backsights in connection with firearms.

Another feature of the invention is the means provided for attaching the device to a firearm and the sighting members of the latter, in such a manner as to require no alteration such as cutting away, screwing into, or the like, of the weapon, while allowing for quick and separable attachment to the latter, and so that the sighting radius of the device can be made to coincide with that of the sighting members already existing and comprising the aiming mechanism of the gun, and thus require no special determination before using, and so the device can be used either with or without the said existing sighting mechanism as a means of quickly and accurately aiming the weapon to which it is attached.

The other features of the invention will be explained in the following specification taken in connection with the accompanying drawings forming part thereof, and more especially pointed out in the claims made for the several parts of the invention.

The object of the invention is to provide a device for the quick and accurate aiming of a weapon to which it is applied, and also to enable a marksman to approximately determine the range, or distance of an objective at the same time and with the same device, as is used in aiming the weapon.

The principle of the construction and use of the device is that of viewing the objective centrally through blank spaces, instead of over the sight edges and projections such as comprise the ordinary backsight and foresight members of a gun such as a rifle, or the like, and commonly known as the "open sight" method, and which prominent experts state to be inadequate for accurate and rapid aiming of a rifle, or gun of any kind.

The defect in the open sight method, is that the human eye cannot accurately focus (and consequently clearly see) the front sight, backsight and objective, simultaneously, while using a gun as required, because the three elements of the combination even if in correct alinement with the eye, are at different distances, and the eye can only focus and therefore clearly see, one of these points at a time, and the other two will appear blurred or indistinct, and to that degree the aim will be defective. Moreover, the textbook authors on aiming a weapon, instruct the marksman to look at the objective, and incidentally over the sighting members of the gun, thus emphasizing this defect in the open sight method.

The device is to be attached to the gun it is to be used with, at the foresight position thereon, and its central point thus adapted to serve as the foresight point whether used with or without the ordinary foresight member in connection with the backsight member of the weapon in aiming the latter, or determining the range of the objective.

As there are many styles of guns in use, and marksmen may desire the invention applied to their weapons no matter what type the latter may be, and of any of the forms in which the invention can be provided, several forms of construction of the device are herein shown and described and the means of attachment to several types of weapon are illustrated, that its complete adaptability to weapons of almost every style may be understood; but pistols, double-barreled guns, machine guns, and large guns, are not illustrated, to avoid undue size in specification and drawings, although it is to be understood that the invention can be applied to all these forms of weapons by suitable modification of design and construction, as well as to those herein shown and described.

The nature and advantages of the invention will now be described in detail in connection with the drawings in which similar letters refer to similar parts throughout the several views.

In the drawings:—Figure 1, represents a side elevation of a rifle of the Lee-Enfield type provided with the invention which is shown in section and in correct distance relation with the several backsights with which the weapon is usually provided, and the sighting radii, eye point, and objective, all illustrated therein. Fig. 2, is a transverse vertical section of the device seen in Fig. 1. Fig. 3, is a side elevation of a magnifying form of the device and the corresponding portion of a rifle in diagrammatic relation with the backsight members, the device and backsights being shown sectionally, that the lenses therein may be seen. Fig. 4, is a front elevation of the device seen in Fig. 3, and Fig. 5, is a rear elevation of the peep backsight member seen in Figs. 1 and 3, as all the corresponding backsight members shown in the two figures are supposed to be alike in construction.

Figure 7:
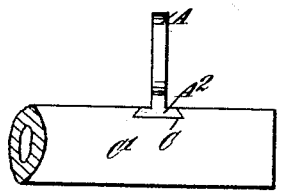
Figure 8:
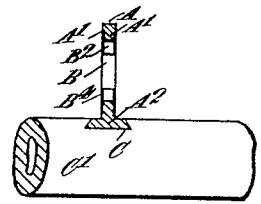
Figure 9:
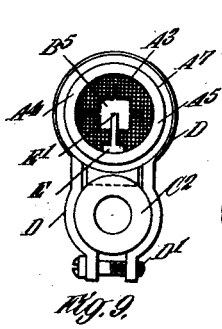
Figure 10:
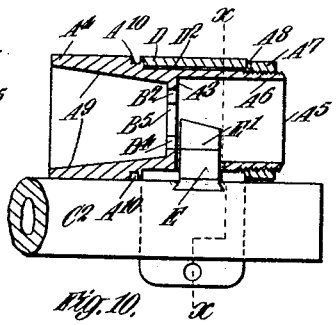
Figure 11:
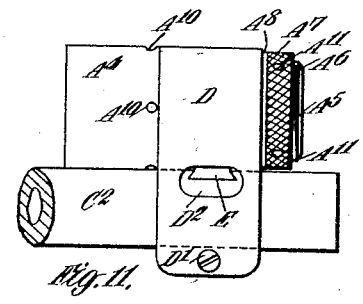
Figure 12:
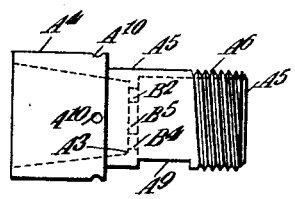
Figure 13:
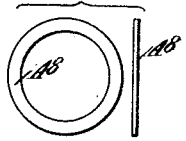
Figure 14:
Figure 15:
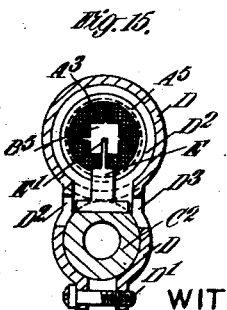
Figure 16:
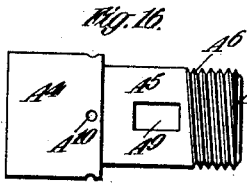
Figure 17:
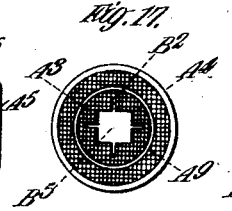
Figure 18:
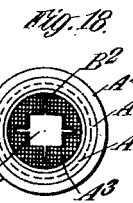

Fig. 6, is a front elevation of a simple form of the device in position upon the corresponding portion of a sporting rifle, and Figs. 7, and 8, are a side elevation and a vertical section, respectively, of Fig. 6. Fig. 9, is a front elevation of another form of the invention separably connected to the corresponding part of a rifle by means of a clip, and Figs. 10, and 11, respectively, are a longitudinal vertical section, and a side elevation of Fig. 9. Fig. 12, is a side elevation of the device detached from the gun barrel and with Figs. 13, 14, which are front and side elevation respectively, of the washer and nut members of the device, comprise the complete article. Fig. 15, is a transverse vertical section of Fig. 10, on the line $x$—$x$, therein, looking from right to left, through which the foresight block projects as seen in Fig. 10, and thus holds the device fixedly, longitudinally and laterally in position, and correct relation with the foresight member of the gun. Figs. 17 and 18, are rear and front elevations, respectively, as seen in Figs. 12 and 16, of the device, showing the dark border around the window and the radial center indicators of the invention.

Figs. 19, 20, 21 and 22, are a rear elevation, a transverse vertical section, a side elevation and a longitudinal vertical section, respectively, of another form of the device provided with an adjustable foresight blade member.

Figs. 23, 24 and 25, are a rear elevation, a side, and a front elevation, respectively, of another form of the invention, in which the diaphragm is made adjustable and the means of attachment to the gun consists of spring clips, that the device may be quickly attached or detached to or from the gun, when desired. Fig. 26, is a rear elevation of the diaphragm having a T shaped window adapted to be used when a comparatively large field of observation around the objective is desired, and in which an objective is represented by arrows as seen at different distances through the window when the device is to be used as a range finder. Fig. 27, is a longitudinal vertical section of the form seen in Figs. 24, 25 and 26, showing the diaphragm in front of the foresight member of the gun. Fig. 28, shows the diaphragm window seen in Fig. 26, provided with a series of cross lines or reticles for the purpose of finding the range of the objective, and illustrating how the device shown in Figs. 23, 24, 25, 26 and 27, may be attached to, or detached from the gun, when desired.

Fig. 29, is a diagram illustrating the principle of the range finding feature of the invention.

Fig. 30, is a transverse vertical section of another form of the invention, looking from the front, showing a method of binding the device to the foresight block by means of a screw, and so that the binding clip may project as little as possible below the gun barrel, as in the case of military rifles, when a bayonet is to be attached to the gun barrel and beneath the latter at this position. This figure also shows the space around the device within the clip allowed for the lateral and vertical adjustment of the device with reference to the foresight. Fig. 31, shows a side elevation partly in section of Fig. 30, and with a means provided for illuminating the interior of the device, when required, and Fig. 32, shows the illuminating member of the device detached from the rest of the device and in a rear view.

Figs. 33, 34 and 35, are a front elevation, a side elevation and longitudinal vertical section respectively, of a magnifying form of the device, shown on a smaller scale in Figs. 3 and 4. Fig. 36, is a rear elevation of the same form, partly in section, and Fig. 37, is a bottom view of it as seen in Fig. 34, showing the notches into which the foresight block projects and positions the device longitudinally and laterally around the foresight, as seen in Figs. 33 and 35. Fig. 38, is a rear elevation of one of the two ring frames of the device, which are alike and as seen in section in Fig. 35.

Figs. 39, 40 and 41, are front, side and rear elevations respectively, of the main backsight member, shown on a smaller scale in Fig. 3, with the lens and lens holder attachment therefor, and Figs. 42, 43 and 44, are front elevations of the lens holder, lens, and lens holder bezel, respectively, seen in the middle of the Figs. 39, 40 and 41, upon the notch block member therein. Figs. 45 and 46, are a section and end view respectively, of the two clamps which bind the notch block which Fig. 47, shows in plan view, to the lens holder, seen also in plan view in Fig. 48. Fig. 49, is a side elevation of the end backsight member lens holder, and Fig. 50, is a sectional end view of the clamp therefor, that binds the lens holder to the backsight member seen in end view in Fig. 51, Fig. 52, is a vertical section of Fig. 49. Fig. 53, is a rear view of the end backsight member with the lens and its holder affixed thereto, and in an enlarged scale, that its nature may be more clearly illustrated. In this figure, an objective is shown as well as the foresight member, the window outlines, and radial center indicators thereof, all in correct alinement, as they appear substantially when an accurate aim is taken at the objective, and when the magnifying form of the device is used. A semi-annular light line is also shown around the outer edge of the foresight member at the edge of the lens, which appears when the device is in correct aim at the objective.

Fig. 54, is a rear elevation of the peep backsight member and Fig. 55, is a side elevation of the same as shown upon a smaller scale in Figs. 1, 3 and 5.

Referring to Figs. 6, 7, and 8, the device is shown in its simplest form comprising a diaphragm A, having the central window B, provided with radial center indicators B', $B^2$, $B^3$, and $B^4$, and which consist of narrow slits extending radially outwardly from the window B, through the diaphragm A. In this form of the device the side surfaces of the diaphragm are made of a dark color by means of a suitable substance A', affixed thereto, and the diaphragm is provided with a flat base $A^2$, and made dovetail in cross section so as to fit tightly though adjustably in a correspondingly shaped groove C, across the top surface of the gun barrel C', at the foresight position thereon. The effect of this arrangement is that the light is shut out to a considerable extent around the window when viewed through and any light reflected from the surface of the diaphragm will be only very slight in degree on account of the absorption of light by the dark colored substance upon the diaphragm. Another effect of this construction is that a dark border is provided around the window B, and as shown in Fig. 6, is of the same width approximately, as the diameter of the window, and the effect of which upon the eye is that the field of vision seen through the window appears to be more distinct and better illuminated, and an objective therein is more clearly defined and more easily centered than in the case of a space provided with an opaque border of slight dimensions only and having no provision against light reflection from its surfaces. The centering of the objective in the window is also facilitated by means of the radial indicators which serve as pointers toward the center of the space in bringing the objective in accurate alinement therewith.

Another desirable result attained by the aid of the indicators, is the determination thereby of the correct vertical position of the foresight over the axis of the gun barrel at a glance, as if this position is not attained, the indicators will appear in slanting positions, instead of true horizontal and vertical positions, if the foresight is not in a true upright position over the gun barrel axis. That the sighting devices of a gun should be truly vertical over the axis of the barrel is well known on account of the necessity of having the trajectory plane of the course of the bullet in a truly vertical position.

In Figs. 9, 10, 12, 15, 17, and 18, the diaphragm $A^3$, is shown as being made integral with a tube $A^4$, and centrally transversally therein, and the window $B^5$, in the diaphragm being square in outline instead of circular as in Fig. 6, but of the same dimensions in width and the indicators being also similar to those shown in Fig. 6. The front portion $A^5$, of the tube $A^4$, is of a smaller diameter than the main body $A^4$, thereof and is threaded at its extremity $A^6$, and provided with a nut $A^7$, and the washer $A^8$, that the tube may be inserted through the clip D, and secured thereto by means of the nut $A^7$, and washer $A^8$, as seen in Figs. 10 and 11. In this form of construction the foresight block E, is secured to the gun barrel $C^2$, in a manner similar to that shown in Fig. 7, but is independent of the diaphragm and reduced in thickness at its upper extremity E', so as to form the blade sight as seen in Fig. 9. The rectangular opening $A^9$, in the smaller portion $A^5$, of the tube $A^4$, shown in Fig. 16, is of the same dimensions substantially as the cross section of the lower portion of the sight block E, and so that the device can be dropped down over the sight block E, and made to rest in position upon the barrel $C^2$. When thus arranged, the clip D, can be adjusted over the barrel $C^2$, and over the portion $A^5$, of the tube $A^4$, and the washer $A^8$, and nut $A^7$, can then be placed thereon and made to bind the device securely in position around the sight and to the barrel, as illustrated, by means of the binding screw $D'$.

The portion $A^5$, of the tube $A^4$, is slightly smaller in diameter than the interior diameter of the clip D, thus leaving a space $D^2$, between, for lateral and vertical adjustment of the tubular member in centering the diaphragm correctly with the foresight blade when adjustment is made therewith as shown in Figs. 10, and 15. The appearance of the interior of the tube $A^4$, and the diaphragm therein when viewed from the rear toward the foresight and objective is shown in Fig. 17; and the front view as in looking backwardly toward the backsight is shown in Fig. 18, where $A^3$, represents the diaphragm and $A^9$, the tapering interior surface of the tube $A^4$, $B^2$, one of the indicators, and the shading representing the darkened appearance of the surfaces produced by the shadows of the tube thereon. The sides of the clip D, are provided with openings $D^2$, $D^3$, that the foresight block E, may be adjusted laterally when desired without requiring removal of the clip from its position on the weapon after being affixed thereon. The holes $A^{10}$, $A^{10}$, $A^{11}$, $A^{11}$, in the tube $A^4$, and nut $A^7$, are for the purpose of attaching pin levers or wrenches to the parts when adjusting the device in position.

Referring to Figs. 19, 20, 21, and 22, the construction of the diaphragm $A^{12}$ with window $B^6$, and tubular member $A^{13}$, is substantially similar to that of the figures already described, but the means of fastening the device to the firearm resembles that shown in Figs. 6, 7 and 8. In this form of construction however, the foresight blade $E^4$, is made adjustable in height by being mounted upon the screw $E^5$, and secured thereto by the nut $E^6$, and the screw being made rotatable in its position by the lever $E^7$, affixed to the screw $E^5$, for the purpose. The side $A^{14}$, of the tube $A^{13}$, is provided with graduation marks $A^{15}$, to indicate the position as to height of the foresight blade when adjusting it.

Referring to Figs. 23, 24, 25, 26, 27 and 28, the diaphragm $A^{16}$, is shown as being adjustably secured to an interior flange $A^{17}$, of the tube $A^{18}$, by means of screws $A^{19}$, $A^{19}$, $A^{19}$, $A^{19}$, and the tubular member $A^{18}$, is provided with spring clips $D^4$, $D^5$, shaped so as to grip upon the gun barrel $C^3$, with a spring tension hold while allowing for its quick and easy adjustment over the foresight block $E^8$, as indicated in Fig. 28. The appearance of the diaphragm and interior flange of the tube when viewed from the rear, that is, toward the objective is indicated in Fig. 23, while Fig. 25, shows the front view of the diaphragm as viewed in a reverse direction. The screws $A^{19}$, $A^{19}$, $A^{19}$, $A^{19}$, are loosely fitted into their corresponding holes in the diaphragm and screw into the flange $A^{17}$, of the tube $A^{18}$, as seen in Figs. 23 and 27. This looseness of fit of the screws in the holes in the diaphragm allows for a slight vertical and lateral adjustment of the diaphragm with reference to the tube so that the center of the window $B^7$, may be made to coincide with the center of the top of the foresight barley-corn member $E^9$, and in front of the same, when viewed along the sighting radius F, as in aiming the weapon to which it is attached, as is seen in Fig. 27. In Figs. 26, and 28, the diaphragm $A^{20}$, is shown as being integral with the tubular member $A^{21}$, and with a vertical and lateral enlargement $B^8$, of the window $B^9$, and giving the latter a T shaped form in effect that a larger portion of the field near the objective may be observed while bringing the objective into accurate alinement with the sighting radius in taking an aim upon the objective. The window $B^9$, in the diaphragm may be provided with vertical and horizontal cross wires or reticles $A^{22}$, $A^{22}$, $A^{23}$, $A^{23}$, arranged at regular intervals as shown in Fig. 28, for the purpose of determining the range or distance of the objective, the method of which will now be explained referring to Fig. 29, which illustrates the principle thereof.

An object represented by the arrow G, at the position H, therein, will appear to be as large as a similar object $G'$, of twice the height or width, located at the position $H'$, if the distance between positions H, and $H'$, be equal to the distance from H, to $H^2$, or the point of observation, and by the same rule, the objects $G^2$, $G^3$, $G^4$, $G^5$ and $G^6$, will each and all appear to be the same size visually as the object G, if the spaces $H'$ to $H^3$, $H^3$, to $H^4$, $H^4$, to $H^5$, $H^5$, to $H^6$, and $H^6$, to $H^7$, are equal to that between H, and $H'$ and H, and $H^2$, as in the diagram, and the objects are of proportionately increased dimensions in size, as distance increases.

In practice, the eye point position $H^2$, is that at which the eye of the marksman is positioned with reference to the foresight position H, as indicated in Fig. 1, and the intervening space represented by the dotted line J, therein, is the "sighting unit" or unit of calculating distances of objectives in the manner described. The spaces between the foresight position and respective backsights are known as the "sighting radii" as indicated by the lines K, $K'$, and $K^2$, in the figure. The space between the foresight H, and backsight position $H^8$, on the sighting line J, is therefore the sighting radius between those two points, and so likewise with the other backsights $H^9$, and $H^{10}$, and the foresight H, $H^{11}$, represents the objective and the space between it and the foresight being of course, a variable one.

By the same law, the rectangular space $G^8$, in Fig. 29, at position H, within the circle $G^9$, will appear as large as the space $G^{10}$, within circle $G^{11}$, at position $H^4$, as will the circle $G^9$, compared with circle $G^{11}$, also. The position $H^4$, is four times as far from the eye position $H^2$, as is position H, in the diagram, hence the arrow, space and circle at position $H^4$, though of four times the dimensions of the corresponding figures at position H, will appear to be visually only of the same size as the latter figures are. And in the same way, all the other arrow figures will appear to be of the same dimensions as those of that at H, as they are of increased dimensions as they recede from the eye position in direct ratio as the distance increases therefrom.

If therefore the dimensions of any of the objects are known and are compared with the space at position H, and the dimensions of the space are known, the distance the object observed in this manner can be approximately judged by simple calculation in proportion in a moment or two.

This method of calculating distances by means of surveying instruments and known as the "stadia" method, is well understood, and needs no further explanation.

In Fig. 26, the upper extension $B^8$, of the window is the same height and three times the width of the dimensions of the lower portion thereof, and all the arrows therein shown represent objects that are of the same dimensions but at different distances from the point of observation. In this case, the object represented by the large vertical arrow at the right of the foresight blade, would be understood as being only half the distance as that on the left of the blade, and one quarter that of the one directly above it; and in like manner, the short vertical arrow object, in the upper extension $B^8$, of the window would be three times as far off as that represented by the long horizontal arrow therein.

By this method, the dimensions of the objective are supposed to be known, but as vehicles, animals, men, posts, trees, windows, buildings, boats, or parts of same, are usually, in the field of observation wherein the objective is located, and as the dimensions of such objects are easily approximately estimated, they can in this way, be used as a basis for calculating the range of the objective, with a degree of accuracy sufficient to meet the requirements of the marksman to adjust the sighting devices of his weapon accordingly before taking an accurate aim at the objective in mind.

The cross lines or reticles $A^{22}$, $A^{23}$, in the window $B^9$, of the diaphragm $A^{20}$, in Fig. 28, aid in more accurately measuring off the apparent dimensions of the objective therein, when desired, and may be fine wires, or the like.

Referring to Figs. 30, and 31, the clip $D^6$, is shown as being secured to the foresight block $E^8$, by means of the screw $E^9$, which passes through the foresight block and through the opposite side of the clip and by means of which the clip is made to clamp securely around the barrel $C^4$, of the gun and against the foresight block that the upper interior portion of the clip may be brought central with the top $E^{10}$, of the foresight. These figures also show an annular space $E^{11}$, between the interior surface $D^7$, of the clip and the exterior surface $A^{24}$, of the tube $A^{25}$, which space allows for lateral and vertical adjustment of the diaphragm with reference to the foresight so as to bring the two members in correct alinement with each other, and which when effected, the parts are secured together permanently by means of the nut $A^{26}$, and washer $A^{27}$, as seen in Fig. 31.

Referring to Figs. 31 and 32, an illuminating disk I, is shown having an aperture $I'$, therein corresponding with the window $B^7$, of the diaphragm and secured in the rear thereof by means of a spring $I^2$, having a pin $I^3$, adapted to engage in a hole $A^{29}$, in the outer wall of the tube $A^{30}$. The illuminating effects of the device are produced therefrom by means of an illuminating material $I^4$, affixed to the rear surface thereof in any suitable manner, and which material may consist of radio active substance or the like such as the hands and figures of watches and clocks are made illuminant with. The degree of such illumination is not to be compared to that produced by an electric or other similar means of illumination but is sufficient to cause the position of the aperture to be visible in the dark and thus indicate the position of the foresight in the night when it cannot otherwise be seen without some such method of making it visible to the marksman. The spring method of attachment provides for its separation from the diaphragm at any time when its use may not be required.

Referring to Figs. 33, 34, 35, 36, 37 and 38, the construction of the device is shown as adapted for the magnification of the objective and surrounding field and in which the diaphragm $A^{31}$, is shown as being of a convex glass lens, such as are used as the object glasses in optical instruments and the like. The outline $B^8$, of the window $B^9$, and the radial indicators are herein illustrated and the latter by the corresponding lines $B^{10}$, $B^{11}$, $B^{12}$, seen in Fig. 33, and which lines may be produced in any suitable manner upon the surface of the glass such as by etching, scratching, or otherwise, or else by a slender frame work of metal, wires, or other material secured against the surface of the lens. A preferable way, however, is that of having shallow grooves $B^{13}$, $B^{14}$, $B^{15}$, $B^{16}$, cut into the surface of the lens in the form of the outline and the indicators, as seen in Fig. 36, and the grooves being preferably polished. This method causes an outline figure of light and shade in the form of the window and the indicators to be visible to the marksman, and due to the reflection of the light by the polished surfaces of the grooves forming the figure.

The optical center of the lens can be indicated in any convenient manner such as by an outline figure around it or by radial indicators pointing toward it as described, or the like. In Fig. 36, it is shown as being a small round aperture $B^{17}$, in the center of lens and window, that the light from the objective and its field, may be obstructed as little as possible, the outline appearing as a slender dark ring produced by the wall of the aperture, while leaving a central light spot to guide the eye in bringing the objective to the foresight point which coincides with the center of the aperture, when the device is in proper position upon the firearm.

This method of indicating an optical point in a lens and the sighting point in this device, and the method of indicating the position of the window and the center indicators in the diaphragm by means of grooves in the glass, are believed to be novel features of this invention, as they make those features visible whether light or dark fields or objects are viewed or aimed at with the device.

The construction of this form of the device is shown as comprising a tubular member $A^{32}$, end ring frames $A^{33}$, $A^{34}$ and a lens carrier $A^{35}$, centrally arranged within the tube $A^{32}$, and trunnioned upon the screws $A^{36}$, $A^{37}$, respectively, thus allowing for a slight longitudinal adjustment thereon as indicated in Fig. 35, by the dotted lines therein. The screw $A^{38}$, is fitted to the upper edge $A^{39}$, of the lens carrier, and passes through the slide $A^{40}$, which is otherwise secured to the top of the tube by means of the rivet $A^{41}$. This construction provides for the longitudinal adjustment vertically of the focal axis of the lens and the degree of adjustment being indicated by the scale $A^{42}$, seen in Fig. 34, in connection with the line $A^{43}$, adjacent thereto and upon the slide $A^{40}$, which has a spring tension bearing upon the tube. The position of the lens when adjusted can also be secured fixedly by screwing the screw $A^{38}$, tightly into the lens carrier and thus clamping the same fixedly in its position. The lens is held in position in the carrier by the bezel $A^{44}$, which is secured to the carrier by the screws $A^{45}$, $A^{45}$, as seen in Fig. 36, and packing rings (not illustrated) of any suitable yielding material are placed around the edge of the lens and upon each side thereof to cushion the lens properly within the lens carrier mechanism so as to secure it against damage by concussion due to the discharge of the weapon or accidental shock of any kind otherwise. The tubular member $A^{32}$, is secured to the end ring frames $A^{33}$, $A^{34}$, by means of pins or screws $A^{46}$, $A^{46}$, $A^{46}$.

The ring frames $A^{33}$, and $A^{34}$, are provided with notches, $A^{47}$, $A^{48}$, respectively, which fit over and engage with the ends of the foresight block $E^{12}$, as indicated in Fig. 35, and thus position the device longitudinally and laterally therewith when placed down thereover. The ring frames are shaped at the bottom thereof so as to fit over the gun barrel $C^5$, and being otherwise shaped as seen in Fig. 38, to meet the requirements.

In attaching this form of the device to the gun barrel it is placed downwardly thereon so that the notches $A^{47}$, $A^{48}$, allow the foresight block $E^{12}$, to project therethrough as seen in Fig. 35, which fixes the device firmly laterally and longitudinally in its position and then the clip $D^7$, is arranged under the gun barrel and the device in proper position, and by means of the screws $D^8$, and $D^9$, which screw into the holes $D^{10}$, $D^{11}$, $D^{12}$, and $D^{13}$, in the ring frames $A^{33}$, $A^{34}$, shown in Fig. 37, and the device becomes thus permanently and rigidly attached to the gun barrel.

The magnifying lens form of the device as thus described can be used either with or without eye piece lenses at any of the backsight positions upon a gun as will now be described by referring to Figs. 39 to 55 inclusive.

In Figs. 39, 40, and 41, L, represents an ordinary backsight of the leaf type to which the backsight block L′, having the sighting notch $L^2$, cut into its upper edge, is slidingly fitted by having a spring tension grip thereon. The lens carrier M, is shaped so as to fit over the block L′, and is provided with screws M′, $M^2$, $M^3$, $M^4$, which are fitted to corresponding holes in the clamps $M^5$, $M^6$, and therefore form a means of binding the lens carrier securely but detachably with the notch block L′. The rear face of the lens carrier M, is recessed to receive the lens N, therein and is provided with a flange $M^7$, and a bezel $M^8$, which is secured in its position by means of screws $M^9$, $M^{10}$, passing through holes therein which screw into the carrier M, and thus providing a means of separably holding the lens in close proximity with the notch block L′, and centrally with reference to the notch $L^2$, therein as seen in Figs. 39, and 41.

Figs. 42, to 48, inclusive show the several parts of the lens carrier, the lens and the notch block detached from each other that their construction may be more easily understood.

In some forms of backsights of the leaf type in addition to the sliding notch block L², member, there is also provided a detachable end notch block O, having a notch O', therein similar to that seen in Fig. 39, at L², and adapted to be used in sighting the weapon at short ranges and when the leaf member is in a horizontal position. A lens carrier is provided for this sighting member also and consisting of the right angle shaped member P, being recessed to receive a lens Q, (see Fig. 52,) and being provided with a bezel P', detachably secured to the lens carrier P, by means of the screws P², P³, in a manner similar to that of the corresponding parts of the lens carrier M, already described. A clamp P⁴, is shaped to fit over the notch block O, and by means of screws P⁵, P⁶, which screw into the lower portion P⁷, of the carrier P, binds the lens carrier to the notch block in a manner similar to that in which the lens carrier M, is secured to the notch block L', as described. Figs. 49, to 52, inclusive show the parts of the device detached and Fig. 53, shows a rear view of the device complete, drawn to an enlarged scale.

In Fig. 53, a view is given of the magnifying foresight member as shown in Fig. 33, through the backsight lens Q, in correct alinement position with the backsight lens carrier P, as just described, and as viewing an objective represented by the dot R, when these three elements are in correct alinement with the eye of the observer. The full line rectangular figure Q', is centrally arranged upon the lens Q, around the optical center of the latter (see Fig. 43) and the dotted rectangular figure B⁸, represents the outline of the window member B⁹, upon the front lens member of the foresight device as shown in Fig. 33, with its indicator lines as well. The shaded semi-circle A³³, represents the rear surface of the ring frame A³³, of the foresight device as seen in Figs. 33, 34, and 35, and seen through lens Q, and it will be noticed that a semi-annular light line S, appears also in the figure (Fig. 53) between the outer edge of the ring frame A³³, and the inner edge of the bezel P'. This light line S, is an important feature of this form of the invention as it appears only when the foresight and backsight lenses are in correct optical alinement with the eye and so that if the objective then appears centrally located in the backsight lens Q, a correct aim is had upon the objective, and the other aiming features of the whole device need not be observed or considered, at all. In this way the eye need only focus upon the objective point of the image of the objective produced by the lenses and which can be easily centered because the eye need only observe incidentally the light field and light semi-circle within the backsight lens which is quite easy to do as compared with trying to observe the foresight blade and the backsight notch edges and corners as well as the objective as is the case when using the ordinary sighting devices with which rifles and the like are provided at present, and which latter operation is physically impossible because the eye cannot accurately focus three objects at different distances simultaneously, even though they are in correct alinement with the eye. Arranging the window outlines Q, and B⁸, concentrically with the objective has also a similar effect in securing an easy quick and accurate aim on the objective, the indicators aiding in the operation.

At whatever position the backsight lens may be located with reference to the foresight lens, if the lenses are made of the proper focal design for the purpose, the view will be substantially the same when an objective is aimed at as has already been described.

In the lenses thus shown and described the one at the foresight position is convex and the one at the rear sight position is concave, and the pair being similar to those in Galilean telescopic constructions, and when properly made for their respective permanent positions and for each other, will require no further longitudinal focal adjustment, and objects can always be seen therethrough (that is, images thereof magnified) by the eye at different positions along the sighting line in the rear of the backsight or eye piece lens, without requiring any special focal adjustment of the lenses with reference to each other or to the eye of the observer, at the time of using the device.

In Figs. 54, and 55, the peep backsight member seen in Figs. 1, 3, and 5, is shown in detail and correct size, and in which T represents the backsight member having the aperture T', at the upper extremity thereof, and that when used in connection with the dial foresight member U, seen in Fig. 1, comprises the long distance sighting mechanism provided on some types of military rifles. The sighting radius of this mechanism is not arranged vertically over the axis of the gun barrel as are the other sighting devices shown and described, but it is located in a plane at the left side of the weapon but which plane, is of course, parallel with the vertical plane of the axis of the gun barrel and sighting mechanism thereover. To utilize this position as a backsight point to be used in connection with the foresight device comprising the invention, a means of bringing the peep sight in vertical alinement therewith is provided comprising the peep sight disk holder T², having the stem T³, which is slidingly fitted in the carrier T⁴, which is slidingly fitted to the peep sight member T, that a lateral and vertical adjustment may be given to the peep sight disk holder T². Caps T⁵, T⁶, are attached to the carrier T⁴, by means of screws T⁷, T⁸, T⁹, T¹⁰, by means of which, the sliding parts of the device may be made adjustable and held securely in position as desired. The peep sight bar T, may be provided with graduation marks T¹¹, thereon as illustrated, to indicate the ranges for elevation of the peep sight holder T², which carries the peep sight disk T¹², having the peep sight aperture T¹³, in the center thereof, and which disk is held in position in the holder by means of the bezel T¹⁴, held in position by screws T¹⁵, T¹⁵, which are screwed into the holder, and the construction of which holder is otherwise like that of the lens carriers M, and P, as already described. The interior dimensions of the holder T², are the same as those of the lens carriers M, and P, as already described, and consequently the dimensions of the aperture disk T¹², are the same as those of the lenses N, and O, as described. The result of this construction is that lenses of the size of the lenses N, and P, can be substituted in the holder T², for the peep sight disk, (and vice versa with the peep sight disk) and this peep back sight position used as the rear sighting position in connection with any of the forms of the foresight as already described and comprising this invention. But if lens positions are to be changed in the backsight or peep sight positions, the lenses both at the front sight and backsight positions must be correspondingly focally altered and shaped to meet the requirements of such changes. An advantage of having the backsight arranged at the peep sight position H⁸, is that the arrangement provides a longer sighting radius from the foresight position H, than the sighting radii from the leaf sight positions H⁹, and H¹⁰, as can be seen by the respective dotted lines J, K, and K′, in Fig. 1. Another advantage is that the peep sight is merely a small opening space through which the window space in the foresight also appears as well as the objective, and the eye need only view the objective and through the spaces centrally and thus requiring but one point to be clearly focused. While the edges of the said two spaces may appear slightly blurred or indistinct when viewing the objective yet the eye intuitively, easily and quickly centers the objective in the spaces viewed through and thus makes the aim of the weapon easily and accurately obtained upon the objective by this means. Another advantage of the peep sight method of taking an aim upon the objective is that a sharper definition of the latter is secured by what is known as the "orthoptic" method than that of the "open" sight method of viewing the objective over the ordinary backsight notch edges and front sight blade member, as is already well known and understood.

The dotted lines in Fig. 54, indicate that a lateral adjustment of the peep sight can be provided for beyond the vertical sight line where adjustment for windage or the like is required, and the stem T³, can have graduations T¹⁶, marked thereon to indicate the lateral position of the peep sight T¹³, in adjusting it.

From the foregoing description of the device the nature and method of operating the invention can be understood without further explanation. It is to be understood, however, that for making distance calculations the space between the eye point H², and the foresight position H, shown in Figs. 1, and 29, should be of a known definite dimension, and which in an ordinary military rifle of the Lee-Enfield type is about three feet as used by the average marksman. A mark H¹³, however, is made upon the upper edge of the gun stock C⁶, to locate the eye point, and over which the eye can be positioned vertically, when determining the range of an objective. This point may be indicated by means of a pin driven into the gun stock or else by a mark made thereon, or in any other suitable manner, and it comprises one of the features of the invention.

It can be seen from the foregoing description that this invention can be applied independently to guns, or to those already provided with sighting devices and used in conjunction therewith and the sighting points thereof made to coincide with the sighting points of the sighting devices thereon and without necessitating any alteration or change made to the weapon or its existing parts in any way. This is an advantage as no re-sighting of the weapon is necessary as in the case where new sighting devices are applied thereto having new sighting lines differing in position from the one in which the existing sighting mechanism is arranged, such as, telescopic devices or the like, when applied to rifles, usually require. Moreover the foresight blade member can be removed or turned down out of the way of the sight if desired as indicated in Fig. 22, and in which case an unobstructed field of view of the objective is provided thus showing that the foresight blade member is not a necessary feature of the invention but only utilized as a means of determining the correct central sighting point of the device in adjusting the latter to the weapon. In the other forms of the device wherein the foresight member is shown, the blade member in practice, appears blurred and diminished in size as the objective is viewed through the window, and it becomes only necessary to center the objective in the window space and in line with the backsight point and the eye, to get a correct aim at the objective.

When the size of the window is to be changed or the sighting unit of distance is to be more or less than three feet, the distance calculations can be accordingly modified, by remembering that the distance of the objective from the eye point, bears the same ratio to the sighting unit (distance from the foresight window to the eye point), as the dimensions of the objective do to the dimensions of the foresight window space. Simple tables of distances and sizes of well known objectives can be worked out and provided to meet all the requirements of such conditions.

In the magnifying forms of the device, the portions of the lens diaphragm outside of the window outlines, can be made opaque or translucent if desired, but even if left transparent the window space is sufficiently indicated by the outlines thereof, and it is otherwise advantageous to have the whole of the lens transparent, on account of giving a larger field of observation around the objective to be seen. The magnifying lens can also be used alone, without a back lens, by making its focal point extend rearwardly to about double the distance the lens is from the eyepoint. The device can be made of any materials used for such articles.

From the foregoing description, it can be seen that this invention provides a simple and effective means for the purposes intended, and for the various types of firearms now in general use, and that it meets all the requirements of such a device.

Having thus described the invention, what we claim and desire to secure by Letters Patent is:—

1. A sighting and range finding device for a firearm, consisting of a diaphragm provided with a symmetrically shaped window of definite dimensions located centrally therein, and having a dark border around the window, substantially as described.

2. A sighting and range finding device for a firearm, consisting of a diaphragm provided with a symmetrically shaped window of definite dimensions located centrally therein and center indicators radiating therefrom, and having a dark border around the window.

3. A sighting and range finding device for a firearm, consisting of a diaphragm provided with a symmetrically shaped open window of definite dimensions located centrally therein and center indicators consisting of slits in the diaphragm radiating from the window, which has a dark border.

4. A sighting and range finding device for a firearm, consisting of a diaphragm provided with a symmetrically shaped window of definite dimensions located centrally therein, and having a dark border around the window, and being provided with means by which the device can be separably and adjustably attached to the firearm at the foresight position thereon and in sighting alinement with the ordinary foresight device thereon, and so that it can be used as the foresight point of the firearm either with or without the ordinary foresight thereon, as desired, for range finding or aiming the firearm.

5. In combination with a firearm, a sighting and range finding device consisting of a diaphragm provided with a symmetrically shaped window of definite dimensions located centrally therein, and having center indicators radiating in horizontal and vertical positions from the window, by means of which when the device is properly secured to the firearm the sighting line can be indicated vertically over the axis of the barrel of the firearm, and being provided with means by which, the device can be properly and securely attached to the firearm at the foresight position thereon.

6. In combination with a firearm, a range finding device having a window therein of definite dimensions and symmetrical shape and an eye point indicator positioned upon the stock of the firearm and at a definite distance from the window of the said device, and by means of which combination distances of objectives can be approximately determined when viewed through the said window from the eye point indicator position.

7. In combination with a firearm, having backsight devices, a sighting and range finding device consisting of a diaphragm provided with a symmetrically shaped window of definite dimensions through which light can pass and the field and objects therein seen therethrough are made to appear of magnified dimensions and having means of center indication, and means by which the diaphragm can be secured to the firearm at the foresight position thereof and the center of the window made to coincide with the foresight point thereof, so the device can be thus utilized in connection with the backsight devices of the firearm as a means for aiming the weapon and objective range finding therewith.

8. In a sighting and range finding device for a firearm, the combination of a diaphragm provided with a symmetrically shaped window of definite dimensions located centrally therein, and a tubular holder within which it is arranged adapted to cause the diaphragm to be darkened in appearance by the shadow of the holder.

9. In combination with a firearm, a foresighting and range finding device consisting of a transparent diaphragm of magnifying power having a window of symmetrical shape and definite dimensions and means for indicating the optical center thereof, and a backsight provided with a separable lens holder device carrying a lens the optical center of which coincides with the back sighting point of the firearm and the lens being in proper focal relation with the foresighting device so that objects can be seen through the two devices in magnified proportions and their optical centers can be used as sighting points in aiming the firearm at an objective.

10. In combination with a firearm, a foresighting and range finding device consisting of a transparent diaphragm of magnifying power having a window of symmetrical shape and definite dimensions and means for indicating the optical center thereof, and a backsight mechanism having a sighting point member provided with means for its vertical and lateral adjustment, a separable lens holder device for the backsight mechanism carrying a lens the optical center of which is visibly arranged to coincide centrally with the backsight member point and the lens being in proper focal relation with the foresighting device so that objects can be seen through the two devices in magnified proportions and their optical centers can be used as sighting points in aiming the firearm at an objective.

11. In combination with a firearm, a foresight device having means for indicating the sighting point centrally therein, and a backsight device having means for indicating the sighting point centrally therein, and the exterior dimensions of the foresight device and interior dimensions of the backsight device being such as to show a line of light concentrically between the two devices when the firearm is in correct aim as seen centrally through both devices.

12. In combination with a firearm, a foresight device having a diaphragm of magnifying power and means for indicating its optical center which center coincides with and serves as the foresight point of the firearm, and a backsight device having a lens provided with means for indicating its optical center and which center coincides with and serves as the backsight point of the firearm, and both devices being so arranged that the outline of the foresight is made to appear slightly smaller than the visible field of the lens of the backsight device when the devices are viewed through from the rear along their focal axes and so that a line of light concentric with the optical centers of the devices appears of uniform dimensions when the firearm is correctly aimed at an objective and as seen centrally through both devices.

13. In combination with a firearm, a foresight device consisting of a diaphragm having a window of symmetrical shape and definite dimensions and means for indicating its center which center is adapted to serve as the foresight point of the firearm, and a backsight device provided with a sighting point aperture which serves as a backsight point located at a definite distance from the foresight point and having means for vertical and lateral adjustment, and by means of which combination the firearm can be aimed at an objective or its range determined.

14. In a sighting and range finding device for a firearm, the combination of a tubular diaphragm holder, a diaphragm secured to the interior of the holder, and arranged so as to be shadowed thereby and its surfaces made to appear dark and having a window located centrally therein of symmetrical shape and definite dimensions and being provided with center indicators, and means by which it can be secured to the firearm at the foresight position thereof.

15. In a sighting and range finding device for a firearm, the combination of a tubular diaphragm holder, a diaphragm adjustably secured to the interior of the holder, and arranged so as to be shadowed thereby and its surfaces made to appear dark and having a window located centrally therein of symmetrical shape and definite dimensions and being provided with center indicators, and means by which it can be secured to the firearm at the foresight position thereof.

16. In a sighting and range finding device for a firearm, the combination of a diaphragm having a window of definite dimensions and symmetrical shape located centrally therein and having center indicators, a tubular holder having the diaphragm so arranged therein as to cause the diaphragm to be in the shadow of the interior of the holder and thus make its surface to appear dark, a clip to which the holder is loosely fitted and by means of which the holder can be secured to the foresight position of the firearm, and a nut fitted to the holder and adapted to bind the holder in position to the clip and to the firearm over its foresight position.

Signed at London, England, this 4th day of February, 1916.

THOMAS FRANCIS GAYNOR.
FREDERICK GRIFFIN.

Witnesses:
H. D. POWELL,
W. E. NEVILLE.